United States Patent
Kaizuka et al.

(10) Patent No.: US 9,598,752 B2
(45) Date of Patent: Mar. 21, 2017

(54) BEARING STEEL

(75) Inventors: Masaki Kaizuka, Kobe (JP);
Mutsuhisa Nagahama, Kobe (JP)

(73) Assignee: Kobe Steel, Ltd., Kobe-shi (JP)

(*) Notice: Subject to any disclaimer, the term of this patent is extended or adjusted under 35 U.S.C. 154(b) by 0 days.

(21) Appl. No.: 13/820,865

(22) PCT Filed: Jul. 25, 2011

(86) PCT No.: PCT/JP2011/066847
§ 371 (c)(1),
(2), (4) Date: Mar. 5, 2013

(87) PCT Pub. No.: WO2012/035884
PCT Pub. Date: Mar. 22, 2012

(65) Prior Publication Data
US 2013/0183191 A1 Jul. 18, 2013

(30) Foreign Application Priority Data
Sep. 15, 2010 (JP) ................. 2010-207163

(51) Int. Cl.
*C22C 38/60* (2006.01)
*C21D 1/32* (2006.01)
(Continued)

(52) U.S. Cl.
CPC ............ *C22C 38/60* (2013.01); *C21D 1/32* (2013.01); *C21D 9/40* (2013.01); *C22C 38/001* (2013.01);
(Continued)

(58) Field of Classification Search
CPC ......... C22C 38/24; C22C 38/26; C22C 38/28; C21D 1/32
See application file for complete search history.

(56) References Cited

U.S. PATENT DOCUMENTS

| 5,788,923 A | 8/1998 | Hayashi et al. |
| 2007/0269336 A1 | 11/2007 | Ohki et al. |
| 2008/0279714 A1* | 11/2008 | Hagiwara ............... 420/118 |

FOREIGN PATENT DOCUMENTS

| CN | 1863935 A | 11/2006 |
| CN | 1961091 A | 5/2007 |

(Continued)

OTHER PUBLICATIONS

International Preliminary Report on Patentability and Written Opinion issued Apr. 18, 2013 in PCT/JP2011/066847 filed on Jul. 25, 2011.

(Continued)

*Primary Examiner* — Kaj K Olsen
*Assistant Examiner* — Alexander Polyansky
(74) *Attorney, Agent, or Firm* — Oblon, McClelland, Maier & Neustadt, L.L.P.

(57) ABSTRACT

Provided is a bearing steel capable of exhibiting excellent cold workability in cold working that follows spheroidizing annealing and also capable of ensuring excellent abrasion resistance and rolling fatigue characteristics as a bearing member or the like. The bearing steel contains C: 0.9 to 1.10%, Si: 0.05 to 0.49%, Mn: 0.1 to 1.0%, P: not more than 0.05% (excluding 0%), S: not more than 0.05% (excluding 0%), Cr: 0.03 to 0.40%, Al: not more than 0.05% (excluding 0%), N: 0.002 to 0.025%, Ti: not more than 0.0030% (excluding 0%), and O: not more than 0.0025% (excluding 0%), with the remainder being iron and unavoidable impurities. The average aspect ratio of cementite is not more than 2.00, the average circle-equivalent diameter of cementite is 0.35 to 0.6 μm, and the number density of cementite having a circle-equivalent diameter of not less than 0.13 μm is not less than $0.45/\mu m^2$.

19 Claims, 2 Drawing Sheets

(51) Int. Cl.
  *C21D 9/40* (2006.01)
  *C22C 38/00* (2006.01)
  *C22C 38/02* (2006.01)
  *C22C 38/04* (2006.01)
  *C22C 38/06* (2006.01)
  *C22C 38/28* (2006.01)
  *F16C 33/62* (2006.01)
  *C22C 38/20* (2006.01)
  *C22C 38/24* (2006.01)
  *C22C 38/26* (2006.01)
  *C22C 38/44* (2006.01)
  *C22C 38/50* (2006.01)

(52) U.S. Cl.
  CPC ............ *C22C 38/002* (2013.01); *C22C 38/02* (2013.01); *C22C 38/04* (2013.01); *C22C 38/06* (2013.01); *C22C 38/20* (2013.01); *C22C 38/24* (2013.01); *C22C 38/26* (2013.01); *C22C 38/28* (2013.01); *C22C 38/44* (2013.01); *C22C 38/50* (2013.01); *F16C 33/62* (2013.01); *C21D 2211/003* (2013.01); *C21D 2211/009* (2013.01)

(56) References Cited

FOREIGN PATENT DOCUMENTS

| | | | |
|---|---|---|---|
| CN | 101565801 A | 10/2009 | |
| JP | 63 135615 | 6/1988 | |
| JP | 9 125202 | 5/1997 | |
| JP | 9 302444 | 11/1997 | |
| JP | 10 122243 | 5/1998 | |
| JP | 10 158790 | 6/1998 | |
| JP | 2000 96185 | 4/2000 | |
| JP | 2000-204445 | 7/2000 | |
| JP | 2000-309849 | 11/2000 | |
| JP | 2000-319748 | 11/2000 | |
| JP | 2001 49388 | 2/2001 | |
| JP | 2001 294972 | 10/2001 | |
| JP | 2002180196 A | * | 6/2002 |
| JP | 2003-183778 | 7/2003 | |
| JP | 2004-091912 | 3/2004 | |
| JP | 2005-002413 A | 1/2005 | |
| JP | 2006-183136 A | 7/2006 | |
| JP | 2006-183137 A | 7/2006 | |
| JP | 2007 224410 | 9/2007 | |
| JP | 2007224410 A | * | 9/2007 |
| JP | 2008 88478 | 4/2008 | |
| JP | 2011 111668 | 6/2011 | |
| JP | 2011111668 A | * | 6/2011 |
| WO | WO 2006/059784 A1 | 6/2006 | |

OTHER PUBLICATIONS

International Search Report Issued Oct. 11, 2011 in PCT/JP11/66847 Filed Jul. 25, 2011.

Extended European Search Report issued on Jun. 3, 2015, in the corresponding European patent application No. 11824893.9.

* cited by examiner

BEARING STEEL

TECHNICAL FIELD

The present invention relates to a bearing steel applied to bearing parts and machine structural parts used for automobiles, various industrial machines, and the like. The present invention particularly relates to a bearing steel that exhibits excellent cold workability in the production of bearing parts or machine structural parts by cold working and also exhibits excellent abrasion resistance and rolling fatigue characteristics in parts after working.

BACKGROUND ART

A bearing part or a machine structural part is processed into the final shape through the processing of a wire rod or a steel bar, such as scission, forging, or cutting. Particularly with respect to cold working (cold rolling or cold forging), a rolled material is so hard as it is that cold working is difficult. Therefore, the material is usually subjected to spheroidizing annealing prior to the cold working for the purpose of improving cold workability.

The ensuring of excellent cold workability is important also in terms of improving productivity and saving energy, thereby reducing cost and $CO_2$ emission. In order to ensure excellent cold workability, it is necessary that deformation resistance is low, cracking does not occur during working, etc.

In addition, parts such as bearings and crank shafts are important parts that support rotating portions or sliding portions of machines. Because of the considerably high contact pressure and also of the varying external force, they are often used in severe environments. Therefore, steel materials, which are their raw materials, are required to have excellent durability.

In recent years, such demands are becoming severer year by year with the development of higher-performance and lighter-weight machines. For the improvement of the durability of shaft parts, although the improvement of techniques related to lubricity is also important, it is particularly important that a steel material has excellent abrasion resistance and rolling fatigue characteristics.

As a steel material used for bearings, a high-carbon chromium bearing steel, such as SUJ2 specified in JIS G 4805 (1999), has been conventionally used in various fields including automobiles, various industrial machines, and the like. However, such a steel material has high contents of carbon (0.95 to 1.1% by mass) and Cr (1.3 to 1.6% by mass), and coarse eutectic carbides, which adversely affect rolling fatigue characteristics, etc., are tend to be produced (e.g., precipitates of not less than 10 µm). In order to prevent the production of such coarse eutectic carbides, it has been necessary to perform, after blooming and before rolling, diffusion annealing at a high temperature (about 1250° C.) for a long period of time (about 17 hours), leading to high production cost. In addition, a bearing part produced from this steel material has been known to have a problem of insufficient rolling fatigue characteristics.

Under such circumstances, various techniques have been proposed as bearing steels.

For example, Patent Document 1 proposes a technique in which the contents of C (less than 0.6 to 0.95% by mass) and Cr (less than 1.3% by mass) are reduced, and also a specified content of B (0.0002 to 0.01% by mass) is included, thereby achieving the omission of the homogenization heat treatment and the shortening of the spheroidizing annealing time, so that the production cost is saved, and also excellent rolling fatigue characteristics and abrasion resistance are both ensured. However, this technique does not consider cold forgeability and may have a problem of cracking during cold forging, etc.

Meanwhile, Patent Document 2 proposes a technique in which the content of C (0.70 to 0.95% by mass) is reduced to shorten the diffusion annealing time, while a specified content of Sb (less than 0.0010% by mass) is included to improve rolling fatigue characteristics. However, this technique does not consider cold forgeability either and may have a problem of cracking during cold forging, etc.

Patent Document 3 discloses a patent in which after the spheroidizing annealing treatment, the average particle size of ferrite and the average particle size of cementite after cold drawing are specified to improve cold workability. However, because the C and Cr contents are high, and eutectic carbides may be produced, diffusion annealing is indispensable. Further, because 20 to 40% cold drawing is performed after spheroidizing annealing, the yield of the steel material decreases, resulting in increased production cost.

PRIOR ART DOCUMENTS

Patent Documents

Patent Document 1: JP-A-2000-96185
Patent Document 2: JP-A-10-158790
Patent Document 3: JP-A-2001-294972

SUMMARY OF THE INVENTION

Problems to be Solved by the Invention

The present invention has been accomplished in view of the above background. An object of the present invention is to establish a bearing steel capable of exhibiting excellent cold workability in cold working that follows spheroidizing annealing and also capable of ensuring excellent abrasion resistance and rolling fatigue characteristics as a bearing member or the like. Further, another object of the present invention is to provide a steel material that allows for the production of a bearing steel having such excellent properties even when diffusion annealing is omitted.

Means for Solving the Problems

The gist of the bearing steel of the present invention that has achieved the object mentioned above is as follows. The bearing steel contains C: 0.9 to 1.10% (% by mass, the same applies hereinafter), Si: 0.05 to 0.49%, Mn: 0.1 to 1.0%, P: not more than 0.05% (excluding 0%), S: not more than 0.05% (excluding 0%), Cr: 0.03 to 0.40%, Al: not more than 0.05% (excluding 0%), N: 0.002 to 0.025%, Ti: not more than 0.0030% (excluding 0%), and O: not more than 0.0025% (excluding 0%), with the remainder being iron and unavoidable impurities. The average aspect ratio of cementite is not more than 2.00, the average circle-equivalent diameter of cementite is 0.35 to 0.6 µm, and the number density of cementite having a circle-equivalent diameter of not less than 0.13 µm is not less than $0.45/\mu m^2$.

In the present invention, it is preferable that the bearing steel further contains, as an additional element, at least one member selected from the group consisting of Cu: not more than 0.25% (excluding 0%), Ni: not more than 0.25% (excluding 0%), and Mo: not more than 0.25% (excluding 0%). According to another preferred embodiment, the bearing steel further contains, as an additional element, Nb: not more than 0.5% (excluding 0%) and/or V: not more than 0.5% (excluding 0%).

Effect of the Invention

According to the present invention, the chemical component composition is appropriately adjusted, and also cementite having a proper size (aspect ratio, equivalent circle diameter) is appropriately dispersed in the steel material (number density). As a result, a bearing steel capable of ensuring excellent cold workability and also excellent abrasion resistance and rolling fatigue characteristics (hereinafter rolling fatigue characteristics and abrasion resistance may be collectively referred to as "durability") can be achieved. Therefore, when the bearing steel of the present invention is applied to a bearing part, it can exhibit excellent durability even when used in a severe environment. In addition, the bearing steel of the present invention, which has a reduced Cr content, does not require long-time diffusion annealing that has been indispensable for conventional SUJ2, and also a spheroidizing annealing treatment can be performed within a short period of time. Therefore, the present invention is also useful for improving productivity and saving energy, thereby reducing cost and $CO_2$ emission.

MODE FOR CARRYING OUT THE INVENTION

The present inventors have conducted examination from various angles to aim for the realization of a bearing steel that exhibits excellent cold workability and durability. As a result, it has been found that in order to achieve excellent cold workability and improve durability in a steel material, it is effective to appropriately control the chemical component composition of the steel material and also control cementite, especially to satisfy the following requirements (A) and (B):

(A) for the improvement of cold workability and rolling fatigue characteristics, control the size of cementite (average circle-equivalent diameter and average aspect ratio) within a predetermined range; and (B) for the improvement of abrasion resistance, to control the number density of cementite within a predetermined range.

Based on the above findings, the present inventors have conducted extensive research to improve the cold workability, abrasion resistance, and rolling fatigue characteristics of a steel material. As a result, they have found that a steel material excellent in terms of the above properties can be achieved when the chemical component composition in the steel material is controlled, and also the production conditions are controlled such that, after spheroidizing annealing, the average aspect ratio of cementite is not more than 2.00, the average circle-equivalent diameter of cementite is 0.35 to 0.6 μm, and the number density of cementite having a circle-equivalent diameter of not less than 0.13 μm is not less than $0.45/\mu m^2$. The present invention has thus been accomplished.

In addition, in the present invention, the Cr content is reduced, whereby the production of coarse eutectoid carbides is suppressed. However, a decrease in the Cr content makes it difficult to obtain a steel that satisfies the above specified cementite. Thus, production conditions have been studied. As a result, it has been found that even in the case where the Cr content is reduced, when the production conditions are strictly controlled, the above specified cementite can be satisfied. At the same time, even when the long-time diffusion annealing, which has been indispensable for conventional steel (SUJ2), is omitted, and also the spheroidizing annealing treatment time is shortened, the bearing steel of the present invention having the above excellent properties can be produced.

First, the cementite specified in the present invention will be described.

In the present invention, it is necessary that the average aspect ratio of cementite is not more than 2.00. When the average aspect ratio is more than 2.00, stress is likely to be concentrated on cementite during cold working, whereby cracking is likely to occur at the interface, resulting in breakage. At the same time, rolling fatigue characteristics deteriorate. The average aspect ratio is preferably not more than 1.90, and more preferably not more than 1.70. The aspect ratio above is a ratio between the major axis and minor axis of cementite based on the measurement method given in the Examples below. In addition, the average aspect ratio in the present invention is an average of 12 fields.

In addition, in the present invention, the average size of cementite also affects cold workability and rolling fatigue characteristics, and thus it is necessary that the average circle-equivalent diameter is 0.35 to 0.6 μm. In the case where the average circle-equivalent diameter of cementite is less than 0.35 μm, deformation resistance increases due to dispersion hardening, whereby cold workability deteriorate. In addition, in the case where it is less than 0.35 μm, cementite disappears during the quenching and tempering treatment, and desired durability is not obtained. The average circle-equivalent diameter is preferably not less than 0.40 μm, and more preferably not less than 0.45 μm. Meanwhile, when the average circle-equivalent diameter of cementite is more than 0.6 μm, this enlarges the fragile site surrounding cementite after quenching and tempering, whereby cracking is likely to occur and progress, resulting in the deterioration of rolling fatigue characteristics. The average circle-equivalent diameter is preferably not more than 0.55 μm, and more preferably not more than 0.5 μm.

The circle-equivalent diameter means, focusing on the size of cementite, the diameter of a circle assumed to have an equal area. As will be described later in the Examples, the circle-equivalent diameter is that of cementite observed on the observation plane under a scanning electron microscope (SEM), and the average circle-equivalent diameter in the present invention is an average of 12 fields.

Further, in the present invention, when the number density of cementite having a circle-equivalent diameter of not less than 0.13 μm identified by the observation of cementite is less than $0.45/\mu m^2$, the abrasion-resistance-improving effect of the dispersion of hard cementite is not effectively exhibited. Therefore, the number density of cementite having a circle-equivalent diameter of not less than 0.13 μm is preferably not less than $0.48/\mu m^2$, and more preferably not less than $0.51/\mu m^2$. No particular upper limit is placed on the number density. However, when the number density is too high, deformation resistance may increase due to dispersion hardening, resulting in the deterioration of cold workability. The number density of cementite is preferably not more than $1.0/\mu m^2$, and more preferably not more than $0.75/\mu m^2$. As will be described later in the Examples, the number density of the present invention is a value obtained by observation in 12 fields.

Incidentally, in the observation of cementite mentioned above, coarse precipitates are excluded from the observation. "Coarse precipitates" means, for example, those having a major axis of not less than 10 μm.

The values of cementite mentioned above are each measured according to the method described in the Examples. As will be described in the Examples, values obtained by observation in the D/4 position of a steel material (D is the diameter) are employed in the present invention. This is because when the results of measurement in the D/4 position satisfy the requirements of the present invention, excellent properties are exhibited not only in terms of cold workability, but also in terms of the abrasion resistance and rolling fatigue characteristics of a part after working.

In the steel material of the present invention, the appropriate adjustment of the chemical component composition (C, Si, Mn, P, S, Cr, Al, N, Ti, O, etc.), including the reduction of the Cr content, is necessary. The reasons for the range limitation on these components are as follows.

[C: 0.9 to 1.10%]

C is an element that is indispensable for increasing quenching hardness, maintaining strength at room temperature and high temperatures, and dispersing cementite to impart abrasion resistance and rolling fatigue characteristics, and also for improving cold workability. In order for such effects to be exhibited, the C content has to be not less than 0.9%, preferably not less than 0.95%, and more preferably not less than 0.97%. However, when the C content is too high, large carbides are likely to be produced in the core part, causing adverse effects on rolling fatigue characteristics. Therefore, the C content should be not more than 1.10%, preferably not more than 1.07%, and more preferably not more than 1.03%.

[Si: 0.05 to 0.49%]

Si is an element useful to improve matrix solid-solution strengthening and hardenability. In order for such effects to be exhibited, the Si content has to be not less than 0.05%, preferably not less than 0.1%, and more preferably not less than 0.2%. However, when the Si content is too high, cold workability significantly deteriorate. Therefore, the Si content should be not more than 0.49%, preferably not more than 0.35%, and more preferably not more than 0.30%.

[Mn: 0.1 to 1.0%]

Mn is an element useful to improve matrix solid-solution strengthening and hardenability. In order for such effects to be exhibited, the Mn content has to be not less than 0.1%, preferably not less than 0.15%, and more preferably not less than 0.2%. However, when the Mn content is too high, cold workability significantly deteriorate. Therefore, the Mn content should be not more than 1.0%, preferably not more than 0.85%, and more preferably not more than 0.8%.

[P: Not more than 0.05% (excluding 0%)]

P is an element that is unavoidably present as an impurity. P segregates at the grain boundary and deteriorates cold workability, and thus is preferably minimized. However, extreme reduction causes an increase in steel production cost. For this reason, the P content has been specified to be not more than 0.05%. The content is reduced to preferably not more than 0.04%, and more preferably not more than 0.03%.

[S: Not more than 0.05% (excluding 0%)]

S is an element that is unavoidably present as an impurity. S precipitates at the grain boundary as FeS and deteriorates cold workability, and also precipitates as MnS and deteriorates rolling fatigue characteristics. Therefore, S is preferably minimized, but extreme reduction causes an increase in steel production cost. For this reason, the S content has been specified to be not more than 0.05%. The content is reduced to preferably not more than 0.04%, and more preferably not more than 0.03%.

[Cr: 0.03 to 0.40%]

Cr is an element that is bonded to C and forms a carbide to improve abrasion resistance and cold workability. In order to obtain such effects, it is necessary that the Cr content is not less than 0.03%. The content is preferably not less than 0.1%, and more preferably not less than 0.2%. However, because Cr is an element that is prone to segregation, when the Cr content is too high, coarse carbides are produced, resulting in the deterioration of rolling fatigue characteristics. Therefore, the Cr content is specified to be not more than 0.40%. The content is preferably not more than 0.35%, and more preferably not more than 0.3%.

[Al: Not more than 0.05% (excluding 0%)]

Al is effective as a deoxidizing element. Al is an element that reduces the amount of oxygen in the steel to enhance rolling fatigue characteristics, and is also bonded to N and forms AlN to improve rolling fatigue characteristics. In order to obtain such effects, it is preferable that the Al content is not less than 0.015%. However, when the Al content is too high, this results in the coarsening of alumina-based inclusions and the deterioration of rolling fatigue characteristics. Therefore, the Al content is not more than 0.05%, preferably not more than 0.04%, and more preferably not more than 0.03%.

[N: 0.002 to 0.025%]

N is an element that is bonded to Al and allows the fine dispersion of an Al-based nitrogen compound to exhibit its improving effect on rolling fatigue characteristics. In order for such effects to be exhibited, the N content is not less than 0.002%, preferably not less than 0.004%, and more preferably not less than 0.005%. However, when the N content is too high, this results in the formation of coarse TiN and the deterioration of rolling fatigue characteristics. Therefore, the N content is not more than 0.025%, preferably not more than 0.020%, and more preferably not more than 0.010%.

[Ti: Not more than 0.0030% (excluding 0%)]

Ti is a harmful element that is bonded to N in the steel and produces TiN, thereby not only adversely affecting rolling fatigue characteristics but also impairing cold workability and hot workability. Therefore, Ti is preferably minimized, but extreme reduction causes an increase in steel production cost. For this reason, the Ti content has to be not more than 0.0030%. Incidentally, the upper limit on the Ti content is preferably not more than 0.0015%, and more preferably not more than 0.0010%.

[O: Not more than 0.0025% (excluding 0%)]

O greatly affects the form of impurities in the steel and forms inclusions such as $Al_2O_3$ and $SiO_2$ that adversely affect rolling fatigue characteristics. Therefore, O is preferably minimized, but extreme reduction causes an increase in steel production cost. For this reason, the O content has to be not more than 0.0025%. Incidentally, the upper limit on the O content is preferably not more than 0.002%, and more preferably not more than 0.0015%.

The contained elements specified in the present invention are as above, and the remainder is iron and unavoidable impurities. As the unavoidable impurities, the incorporation of elements introduced depending on the conditions including raw materials, materials, production facilities, and the like is acceptable. Incidentally, it is also possible to positively introduce the following elements within the specified ranges to enhance rolling fatigue characteristics.

[Containing at least one member selected from the group consisting of Cu: Not more than 0.25% (excluding 0%), Ni: Not more than 0.25% (excluding 0%), and Mo: Not more than 0.25% (excluding 0%)]

Cu, Ni, and Mo are each an element that functions as an element that improves the hardenability of the parent phase and enhances hardness to contribute to the improvement of rolling fatigue characteristics. Any one or more of them may be contained. These effects are effectively exhibited when the contents are each preferably not less than 0.03%, and more preferably not less than 0.05%. However, in each case, a content of more than 0.25% leads to the deterioration of processability. The content is preferably not more than 0.23%, and more preferably not more than 0.20%.

[Nb: Not more than 0.5% (excluding 0%) and/or V: Not more than 0.5% (excluding 0%)]

Nb and V are each an element that is bonded to N and forms a nitrogen compound to thereby size crystal grains. They are effective in improving rolling fatigue characteristics and can be used alone or in combination. These effects are effectively exhibited when the contents are each preferably not less than 0.001%, and more preferably not less than 0.003%. However, in each case, a content of more than 0.5% leads to the formation of fine crystal grains, whereby an incomplete quenching phase is likely to be formed. The contents are each preferably not more than 0.3%, and more preferably not more than 0.1%.

In the present invention, the Cr content is specified to be within the range mentioned above. When the Cr content is reduced to not more than 0.40%, it becomes difficult to stably disperse cementite of the above predetermined size. Therefore, in the steel material of the present invention, in order to perform spheroidizing annealing to ensure cementite of a predetermined size afterwards, the production conditions (especially the conditions of spheroidizing annealing performed after rolling) also have to be appropriately controlled. In the present invention, a steel material obtained by hot rolling is heated to the soaking temperature (A1+10° C. to A1+40° C.) at an average temperature rise rate of 40 to 100° C./hr, and then retained at the soaking temperature for 4 to 8 hours. Subsequently, the soaking temperature is reduced to (A1−60° C.) at a primary cooling rate (average cooling rate) within a range of 5 to 15° C./hr and further allowed to drop to room temperature (25° C.) as secondary cooling. As a result, cementite of the above predetermined size can be stably dispersed.

When the average temperature rise rate is less than 40° C./hr, cementite is coarsened. As a result, cementite having the above desired average circle-equivalent diameter is not obtained, and, at the same time, the dispersion state of cementite (i.e., the predetermined number density) is not obtained. When it is more than 100° C./hr, pearlite cannot be divided, and the aspect ratio of cementite exceeds the above predetermined value. In addition, when it is more than 100° C./hr, this results in small cementite, and cementite having the above predetermined average circle-equivalent diameter is not obtained. The average temperature rise rate is preferably not less than 50° C./hr, and more preferably not less than 60° C./hr, and is also preferably not more than 90° C./hr, and more preferably not more than 80° C./hr.

When the soaking temperature is less than A1+10° C., pearlite cannot be divided, and the aspect ratio of cementite exceeds the above specified value. In addition, when the soaking temperature is more than A1+40° C., cementite in pearlite is excessively dissolved, causing the precipitation of regenerated pearlite. As a result, the aspect ratio exceeds the above specified value.

When the retention time at the soaking temperature (A1+10° C. to A1+40° C.) is less than 4 hours, cementite is provided with a small diameter. As a result, the above predetermined size is not obtained. In addition, when the retention time is more than 8 hours, the coarsening of cementite progresses, providing cementite with a large diameter. As a result, the above predetermined size is not obtained, and also the dispersion state of cementite is not obtained.

In cooling at a primary cooling rate of less than 5° C./hr, cementite is coarsened, and the desired size is not obtained. In addition, when it is more than 15° C./hr, cementite is provided with a small diameter, and the above predetermined size is not obtained.

Incidentally, primary cooling is performed within a range from the soaking temperature to (A1−60° C.). This is the temperature set to reliably obtain the above specified cementite. Therefore, as long as the above specified cementite is obtained, the primary cooling finishing temperature may be higher (e.g., A1−50° C., etc.). In addition, when cooling is performed at the above primary cooling rate after the temperature reached A1−60° C., productivity deteriorates.

In addition, the secondary cooling rate is not particularly limited. However, in terms of improving productivity, it is preferable that the temperature is allowed to drop (allowed to cool in the air).

The steel material of the present invention is subjected to spheroidizing annealing as above, then processed into a predetermined part shape, quenched and tempered, and thereby formed into a bearing part, etc. The shapes of steel materials include any of linear and cylindrical shapes that can be applied to such production, and the size can also be suitably determined according to the final product.

Incidentally, the structure of the bearing steel of the present invention after spheroidizing annealing is specified. It has been confirmed by an experiment that when a bearing steel satisfies the above specified structure after spheroidizing annealing, in the case where it is processed into a predetermined part shape, subsequently quenched, and tempered into a bearing part, such a bearing part exhibits excellent abrasion resistance and rolling fatigue characteristics when used (see the Examples below).

Examples

Hereinafter, the present invention will be described in further detail through examples. The present invention is not limited to the following examples, and, needless to say, any modification in the range of the purpose described above or below is within the technical scope of the present invention.

Steel materials of the chemical component composition shown in Table 1 below were each heated to 1100 to 1300° C. in a heating furnace, then bloomed at 900 to 1200° C., and subsequently hot rolled at a temperature range of 800 to 1100° C. (including forging that simulates rolling) to give a round bar material having a diameter of 65 mm.

The obtained round bar material was subjected to spheroidizing annealing under the spheroidizing heat treatment conditions shown in Table 2 (temperature rise rate, soaking temperature, soaking time, and primary cooling rate to A1−60° C.) to give a test material. At this time, the temperature was allowed to drop from A1−60° C. to room temperature (25° C.) in the air (secondary cooling).

Incidentally, after blooming, only a test material No. 1 was soaked in a soaking furnace at 1230° C. for 17 hours (diffusion annealing) and then hot rolled (No. 1 was used as the standard steel for comparison).

[Presence of Large Carbides]

Figure 1:
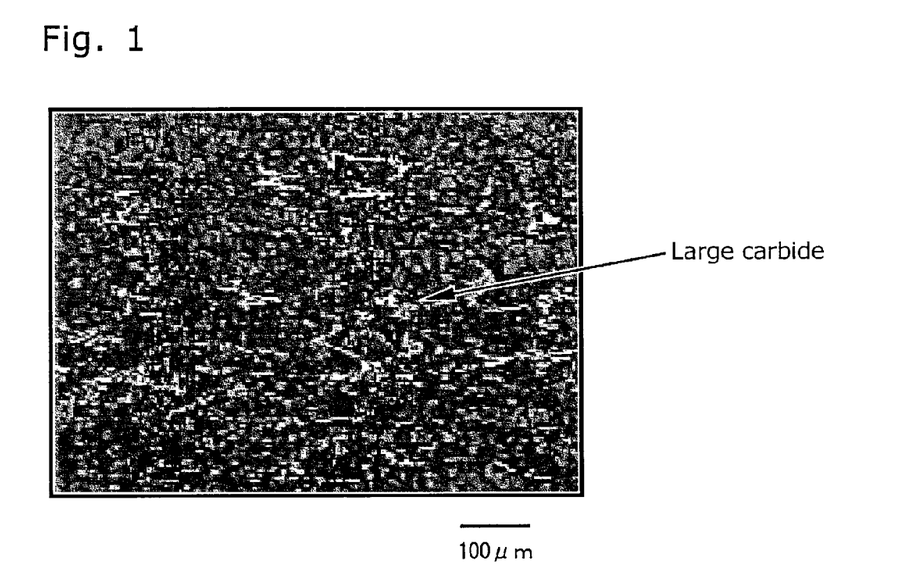
FIG. 1 shows a photograph of a coarse carbide identified in a billet No. 2 in the Examples.

The cross-sectional macroscopic structure of each test material in the D/2 position (D is the diameter) was observed under an optical microscope (magnification: ×100) (the number of observation fields: 1) to determine the presence of large carbides. In the case where a large carbide of not less than 10 μm as shown in the photograph of FIG. 1 was seen, it was determined that large carbides were "present".

[Number Density, Average Circle-Equivalent Diameter, and Average Aspect Ratio of Cementite]

A test material was cut perpendicularly to the longitudinal direction (rolling direction). In the D/4 position (D is the diameter) of the longitudinal cross-section (perpendicular to the rolling direction), the test material was further cut horizontally in the longitudinal direction. The horizontal section was mirror-polished and corroded with 5% picral to cause the phanerosis of the metal structure. Subsequently, the horizontal section was observed and photographed in arbitrary 12 positions on the D/4 position line (2688 μm² per field) under a scanning electron microscope (magnification: ×2000). From the contrast of the image, white parts were determined as cementite particles and marked. Using a particle analysis software ([Particle Analyzer III for windows, Version 3.00, manufactured by SUMITOMO METAL TECHNOLOGY]), the circle-equivalent diameter (μm) was calculated from the area of each marked cementite particle, and the average of 12 fields was determined ("average circle-equivalent diameter").

In addition, the number of cementite particles having a circle-equivalent diameter of not less than 0.13 μm present per unit area (the number of particles/μm²) was determined ("number density").

Further, the aspect ratio of cementite was determined, and the average of 12 fields was determined ("average aspect ratio").

Incidentally, in the above cementite measurement, those of less than 0.13 μm were not subjected to the measurement.

[Cold Workability (Cracking/Deformation Resistance)]

Using the above test material, a columnar test piece having a diameter of 14 mm and a height of 21 mm was cut from the center of the test material and used as a test piece for the evaluation of cold workability.

The test piece was cold worked using a press testing machine at a working rate (compressibility) of 60%. Subsequently, the side of the test piece was observed under an optical microscope (magnification: ×20) to determine the presence of cracks. In addition, deformation resistance (MPa) in the case where the test piece was cold worked at a working rate (compressibility) of 40% was measured, and deformation resistance reduction was calculated by comparison with the deformation resistance of the test piece of the steel No. 1 and evaluated. Incidentally, the working rate is represented by $[\{(1-L/L_0)\}\times100(\%)]$ (L is the length of a test piece before working, and $L_0$ is the length of a test piece after working).

Evaluation Criteria: When a test piece had no cracks and had a deformation resistance reduction of not less than 5% relative to the test piece No. 1, the cold workability were rated as excellent (○). Meanwhile, in the case where a test piece had a higher deformation resistance than No. 1, or in the case where a test piece had a reduced deformation resistance but had a deformation resistance reduction of less than 5%, the cold workability were rated as poor (×).

[Rolling Fatigue Characteristics]

A thrust test piece (shape: disc-like, size: ϕ60 mm×2 mm in thickness) was prepared from a test material. Using a thrust-type rolling fatigue testing machine ("FJ-5T" manufactured by Fuji Testing Machine Corporation), each test piece was subjected to a rolling fatigue test repeated 16 times under the conditions of rate: 1800 rpm, surface pressure: 5.3 GPa, the number of stoppages: $2\times10^8$. The fatigue life $L_{10}$ (the number of stress repetition until fatigue failure at a cumulative failure probability of 10%, which is obtained by plotting on Weibull probability paper) was thereby evaluated.

The fatigue life $L_{10}$ (L10 life) of the test piece No. 1 was taken as 1.0. When a test piece had a L10 life of not less than 1.0, the rolling fatigue characteristics were rated as excellent.

[Abrasion Resistance]

Using a thrust-type rolling fatigue testing machine, the above thrust test piece was repeatedly rotated under the following conditions of rate: 1800 rpm, surface pressure: 5.3 Gpa, the number of stoppages: $1\times10^8$. The resulting abrasion depth was defined as the amount of abrasion. At this time, each steel material was subjected to the test three times (n=3). The amount of abrasion of the test piece No. 1 was taken as 1. When a test piece had an abrasion amount of not more than 1.00, the abrasion resistance was rated as excellent.

TABLE 1

| Kind of Steel | Chemical Component (% by mass) * The remainder: iron and unavoidable impurities | | | | | | | | | | |
|---|---|---|---|---|---|---|---|---|---|---|---|
| | C | Si | Mn | P | S | Cr | Al | Ti | N | O | Others |
| 1 | 1.01 | 0.24 | 0.34 | 0.013 | 0.005 | 1.43 | 0.022 | 0.0015 | 0.0043 | 0.0005 | — |
| 2 | 1.01 | 0.24 | 0.34 | 0.013 | 0.005 | 1.43 | 0.022 | 0.0015 | 0.0043 | 0.0005 | — |
| 3 | 1.05 | 0.21 | 0.31 | 0.005 | 0.005 | 0.24 | 0.002 | 0.0002 | 0.0035 | 0.0014 | — |
| 4 | 1.04 | 0.19 | 0.33 | 0.007 | 0.005 | 0.24 | 0.018 | 0.0005 | 0.0037 | 0.0006 | — |
| 5 | 0.91 | 0.4 | 0.2 | 0.012 | 0.004 | 0.38 | 0.017 | 0.0007 | 0.0035 | 0.0006 | — |
| 6 | 0.96 | 0.15 | 0.41 | 0.007 | 0.005 | 0.23 | 0.002 | 0.0001 | 0.0028 | 0.0018 | |
| 7 | 0.96 | 0.15 | 0.41 | 0.007 | 0.005 | 0.23 | 0.002 | 0.0001 | 0.0028 | 0.0018 | — |
| 8 | 0.96 | 0.15 | 0.41 | 0.007 | 0.005 | 0.23 | 0.002 | 0.0001 | 0.0028 | 0.0018 | — |
| 9 | 0.96 | 0.15 | 0.41 | 0.007 | 0.005 | 0.23 | 0.002 | 0.0001 | 0.0028 | 0.0018 | — |
| 10 | 0.96 | 0.15 | 0.41 | 0.007 | 0.005 | 0.23 | 0.002 | 0.0001 | 0.0028 | 0.0018 | — |
| 11 | 0.96 | 0.15 | 0.41 | 0.007 | 0.005 | 0.23 | 0.002 | 0.0001 | 0.0028 | 0.0018 | — |
| 12 | 0.96 | 0.15 | 0.41 | 0.007 | 0.005 | 0.23 | 0.002 | 0.0001 | 0.0028 | 0.0018 | — |
| 13 | 0.96 | 0.15 | 0.41 | 0.007 | 0.005 | 0.23 | 0.002 | 0.0001 | 0.0028 | 0.0018 | — |
| 14 | 0.96 | 0.15 | 0.41 | 0.007 | 0.005 | 0.23 | 0.002 | 0.0001 | 0.0028 | 0.0018 | — |

TABLE 1-continued

| Kind of Steel | Chemical Component (% by mass) * The remainder: iron and unavoidable impurities | | | | | | | | | | |
|---|---|---|---|---|---|---|---|---|---|---|---|
| | C | Si | Mn | P | S | Cr | Al | Ti | N | O | Others |
| 15 | 0.96 | 0.15 | 0.41 | 0.007 | 0.005 | 0.23 | 0.002 | 0.0001 | 0.0028 | 0.0018 | — |
| 16 | 0.96 | 0.15 | 0.41 | 0.007 | 0.005 | 0.23 | 0.002 | 0.0001 | 0.0028 | 0.0018 | — |
| 17 | 0.96 | 0.15 | 0.41 | 0.007 | 0.005 | 0.23 | 0.002 | 0.0001 | 0.0028 | 0.0018 | — |
| 18 | 0.96 | 0.15 | 0.41 | 0.007 | 0.005 | 0.23 | 0.002 | 0.0001 | 0.0028 | 0.0018 | — |
| 19 | 0.96 | 0.15 | 0.41 | 0.007 | 0.005 | 0.23 | 0.002 | 0.0001 | 0.0028 | 0.0018 | — |
| 20 | 0.96 | 0.15 | 0.41 | 0.007 | 0.005 | 0.23 | 0.002 | 0.0001 | 0.0028 | 0.0018 | — |
| 21 | 0.96 | 0.15 | 0.41 | 0.007 | 0.005 | 0.23 | 0.002 | 0.0001 | 0.0028 | 0.0018 | — |
| 22 | 0.96 | 0.15 | 0.41 | 0.007 | 0.005 | 0.23 | 0.002 | 0.0001 | 0.0028 | 0.0018 | — |
| 23 | 0.94 | 0.32 | 0.8 | 0.005 | 0.005 | 0.15 | 0.03 | 0.001 | 0.006 | 0.0008 | — |
| 24 | 1.08 | 0.3 | 0.5 | 0.007 | 0.003 | 0.3 | 0.018 | 0.0011 | 0.007 | 0.0009 | — |
| 25 | 0.87 | 0.3 | 0.12 | 0.006 | 0.002 | 0.25 | 0.034 | 0.001 | 0.0049 | 0.001 | — |
| 26 | 0.95 | 0.5 | 1.06 | 0.06 | 0.07 | 0.25 | 0.06 | 0.0032 | 0.0052 | 0.0028 | — |
| 27 | 0.94 | 0.34 | 0.8 | 0.005 | 0.005 | 0.15 | 0.03 | 0.0009 | 0.0062 | 0.0008 | Cu: 0.05 |
| 28 | 0.94 | 0.32 | 0.62 | 0.005 | 0.005 | 0.2 | 0.028 | 0.001 | 0.0068 | 0.0008 | Ni: 0.10, Mo: 0.10 |
| 29 | 0.97 | 0.3 | 0.42 | 0.005 | 0.005 | 0.28 | 0.03 | 0.0011 | 0.0041 | 0.0007 | V: 0.05, Nb: 0.03 |
| 30 | 1.08 | 0.35 | 0.5 | 0.008 | 0.003 | 0.43 | 0.024 | 0.0001 | 0.0028 | 0.0009 | — |
| 31 | 0.98 | 0.03 | 0.09 | 0.061 | 0.054 | 0.23 | 0.025 | 0.0001 | 0.0015 | 0.0018 | — |
| 32 | 0.95 | 0.15 | 0.09 | 0.007 | 0.005 | 0.02 | 0.019 | 0.0001 | 0.0282 | 0.0018 | — |

TABLE 2

| Kind of Steel | Transformation Temperature A1 (° C.) | Spheroidizing Heat Treatment Conditions | | | |
|---|---|---|---|---|---|
| | | Temperature Rise Rate (° C./hr) | Soaking Temperature (° C.) | Soaking Time (hr) | Cooling Rate to (A1 − 60° C.) (° C./hr) |
| 1 | 751 | 80 | 795 | 6 | 15 |
| 2 | 751 | 80 | 795 | 6 | 15 |
| 3 | 730 | 80 | 750 | 6 | 10 |
| 4 | 729 | 80 | 750 | 6 | 10 |
| 5 | 739 | 80 | 750 | 6 | 10 |
| 6 | 727 | 80 | 750 | 6 | 10 |
| 7 | 727 | 20 | 750 | 6 | 10 |
| 8 | 727 | 40 | 750 | 6 | 10 |
| 9 | 727 | 100 | 750 | 6 | 10 |
| 10 | 727 | 120 | 750 | 6 | 10 |
| 11 | 727 | 80 | 730 | 6 | 10 |
| 12 | 727 | 80 | 740 | 6 | 10 |
| 13 | 727 | 80 | 760 | 6 | 10 |
| 14 | 727 | 80 | 770 | 6 | 10 |
| 15 | 727 | 80 | 750 | 2 | 10 |
| 16 | 727 | 80 | 750 | 4 | 10 |
| 17 | 727 | 80 | 750 | 8 | 10 |
| 18 | 727 | 80 | 750 | 10 | 10 |
| 19 | 727 | 80 | 750 | 6 | 3 |
| 20 | 727 | 80 | 750 | 6 | 5 |
| 21 | 727 | 80 | 750 | 6 | 15 |
| 22 | 727 | 80 | 750 | 6 | 30 |
| 23 | 726 | 80 | 750 | 6 | 10 |
| 24 | 731 | 80 | 745 | 6 | 10 |
| 25 | 735 | 80 | 750 | 6 | 10 |
| 26 | 730 | 80 | 750 | 6 | 10 |
| 27 | 727 | 80 | 750 | 6 | 10 |
| 28 | 729 | 80 | 750 | 6 | 10 |
| 29 | 732 | 80 | 750 | 6 | 10 |
| 30 | 735 | 80 | 750 | 6 | 10 |
| 31 | 727 | 80 | 750 | 6 | 10 |
| 32 | 727 | 80 | 750 | 6 | 10 |

TABLE 3

| Billet Kind of Steel | Cementite after Spheroidizing Heat Treatment | | | Cold Workability | | | Rolling Fatigue Characteristics | | Abrasion Resistance | |
|---|---|---|---|---|---|---|---|---|---|---|
| | Presence of Large Carbides | Average Circle-Equivalent Diameter (μm) | Average Aspect Ratio | Number Density (the number of particles/μm$^2$) | Deformation Resistance (MPa) | Deformation Resistance Reduction (%) | Determination of Cracks | L10 Life (times) | L10 Life Ratio | Abrasion Amount (μm) | Abrasion Ratio |
| 1 | Absent | 0.41 | 1.56 | 0.57 | 905 | 0 | ○ | $4.3 \times 10^6$ | 1.0 | 3.3 | 1.0 |
| 2 | Present | 0.42 | 1.58 | 0.55 | 910 | −0.41 | X | $2.2 \times 10^6$ | 0.5 | 3.4 | 1.03 |
| 3 | Absent | 0.45 | 1.64 | 0.59 | 845 | 6.63 | ○ | $5.4 \times 10^6$ | 1.3 | 2.6 | 0.8 |
| 4 | Absent | 0.45 | 1.70 | 0.56 | 831 | 8.18 | ○ | $6.9 \times 10^6$ | 1.6 | 3.0 | 0.9 |
| 5 | Absent | 0.50 | 1.58 | 0.53 | 833 | 7.96 | ○ | $5.0 \times 10^6$ | 1.2 | 3.1 | 0.9 |
| 6 | Absent | 0.39 | 1.66 | 0.62 | 828 | 8.51 | ○ | $1.2 \times 10^7$ | 2.8 | 2.2 | 0.7 |
| 7 | Absent | 0.69 | 1.56 | 0.43 | 805 | 11.05 | ○ | $2.2 \times 10^6$ | 0.5 | 3.5 | 1.1 |
| 8 | Absent | 0.52 | 1.60 | 0.56 | 818 | 9.61 | ○ | $5.3 \times 10^6$ | 1.2 | 2.9 | 0.9 |
| 9 | Absent | 0.37 | 1.86 | 0.65 | 848 | 6.30 | ○ | $1.4 \times 10^7$ | 3.3 | 2.6 | 0.8 |
| 10 | Absent | 0.33 | 2.12 | 0.70 | 930 | −2.76 | X | $4.0 \times 10^6$ | 0.9 | 4.0 | 1.2 |
| 11 | Absent | 0.35 | 2.08 | 0.68 | 923 | −1.99 | X | $3.4 \times 10^6$ | 0.8 | 4.5 | 1.4 |
| 12 | Absent | 0.38 | 1.59 | 0.62 | 841 | 7.07 | ○ | $1.3 \times 10^7$ | 3.1 | 2.5 | 0.8 |
| 13 | Absent | 0.44 | 1.63 | 0.59 | 830 | 8.29 | ○ | $8.2 \times 10^6$ | 1.9 | 3.0 | 0.9 |
| 14 | Absent | 0.50 | 2.20 | 0.57 | 824 | 8.95 | X | $3.8 \times 10^6$ | 0.9 | 4.8 | 1.5 |
| 15 | Absent | 0.33 | 1.87 | 0.69 | 920 | −1.66 | ○ | $1.5 \times 10^7$ | 3.4 | 2.7 | 0.8 |

TABLE 3-continued

| Billet | | Cementite after Spheroidizing Heat Treatment | | | Cold Workability | | | Rolling Fatigue Characteristics | | Abrasion Resistance | |
|---|---|---|---|---|---|---|---|---|---|---|---|
| | | Average | | Number | Deformation | | | | | | |
| Kind of Steel | Presence of Large Carbides | Circle-Equivalent Diameter (μm) | Average Aspect Ratio | Density (the number of particles/μm²) | Deformation Resistance (MPa) | Resistance Reduction (%) | Determination of Cracks | L10 Life (times) | L10 Life Ratio | Abrasion Amount (μm) | Abrasion Ratio |
| 16 | Absent | 0.36 | 1.67 | 0.66 | 853 | 5.75 | ○ | 1.4 × 10⁷ | 3.2 | 2.3 | 0.7 |
| 17 | Absent | 0.52 | 1.59 | 0.55 | 813 | 10.17 | ○ | 5.0 × 10⁶ | 1.2 | 2.8 | 0.8 |
| 18 | Absent | 0.68 | 1.79 | 0.44 | 808 | 10.72 | ○ | 2.5 × 10⁶ | 0.6 | 3.6 | 1.1 |
| 19 | Absent | 0.63 | 1.53 | 0.48 | 800 | 11.60 | ○ | 3.0 × 10⁶ | 0.7 | 3.2 | 1.0 |
| 20 | Absent | 0.48 | 1.55 | 0.58 | 820 | 9.39 | ○ | 6.5 × 10⁶ | 1.5 | 2.9 | 0.9 |
| 21 | Absent | 0.37 | 1.68 | 0.64 | 839 | 7.29 | ○ | 1.4 × 10⁷ | 3.2 | 2.7 | 0.8 |
| 22 | Absent | 0.32 | 1.88 | 0.71 | 910 | −0.55 | ○ | 1.5 × 10⁷ | 3.4 | 2.6 | 0.8 |
| 23 | Absent | 0.52 | 1.68 | 0.53 | 850 | 6.08 | ○ | 6.4 × 10⁶ | 1.5 | 3.0 | 0.9 |
| 24 | Absent | 0.54 | 1.70 | 0.56 | 855 | 5.52 | ○ | 7.2 × 10⁶ | 1.7 | 2.6 | 0.8 |
| 25 | Absent | 0.52 | 1.81 | 0.43 | 827 | 8.62 | ○ | 6.4 × 10⁶ | 1.5 | 3.7 | 1.1 |
| 26 | Absent | 0.47 | 1.93 | 0.56 | 950 | −4.97 | ○ | 2.4 × 10⁶ | 0.6 | 3.0 | 0.9 |
| 27 | Absent | 0.51 | 1.68 | 0.51 | 851 | 5.97 | ○ | 8.1 × 10⁶ | 1.9 | 3.1 | 0.9 |
| 28 | Absent | 0.52 | 1.63 | 0.53 | 848 | 6.30 | ○ | 1.2 × 10⁷ | 2.8 | 3.0 | 0.9 |
| 29 | Absent | 0.55 | 1.59 | 0.56 | 847 | 6.41 | ○ | 8.0 × 10⁶ | 1.9 | 2.9 | 0.9 |
| 30 | Present | 0.34 | 1.58 | 0.80 | 858 | 5.19 | ○ | 3.2 × 10⁶ | 0.7 | 2.4 | 0.7 |
| 31 | Absent | 0.44 | 1.72 | 0.64 | 808 | 10.72 | ○ | 2.9 × 10⁶ | 0.7 | 2.6 | 0.8 |
| 32 | Absent | 0.39 | 2.04 | 0.72 | 910 | −0.55 | X | 3.5 × 10⁶ | 0.8 | 2.3 | 0.7 |

These results lead to the following discussion. That is, in Nos. 3 to 6, 8, 9, 12, 13, 16, 17, 20, 21, 23, 24, and 27 to 29, the requirements specified in the present invention (chemical component composition, circle-equivalent diameter of cementite, aspect ratio, number density) are satisfied. Cracking did not occur in any of them, and deformation resistance was lower than that of conventional steel (No. 1:SUJ2), indicating excellent cold workability. In addition, the rolling fatigue characteristics and abrasion resistance of the test pieces after working were also excellent.

In No. 2, because of the high Cr content, large carbides were formed in the billet. As a result, cold workability, rolling fatigue characteristics, and abrasion resistance were poor, and also cracking occurred in the test piece.

In Nos. 7, 10, 11, 14, 15, 18, 19, and 22, the spheroidizing heat treatment conditions are outside the ranges specified in the present invention.

In No. 7, because of the low temperature rise rate, the average circle-equivalent diameter and the number density of cementite are outside the ranges specified in the present invention. As a result, rolling fatigue characteristics and abrasion resistance are poor.

In No. 10, because of the high temperature rise rate, the average circle-equivalent diameter and the average aspect ratio of cementite were outside the range specified in the present invention. As a result, cold workability, rolling fatigue characteristics, and abrasion resistance were poor, and also cracking occurred in the test piece.

In No. 11, because of the low soaking temperature, the average aspect ratio of cementite exceeded the range specified in the present invention. As a result, cold workability, rolling fatigue characteristics, and abrasion resistance were poor, and also cracking occurred in the test piece.

In No. 14, because of the high soaking temperature, the average aspect ratio of cementite exceeded the range specified in the present invention. As a result, rolling fatigue characteristics and abrasion resistance were poor, and also cracking occurred in the test piece.

In No. 15, because of the short soaking time, the average circle-equivalent diameter of cementite is below the range specified in the present invention. As a result, cold workability are poor.

In No. 18, because of the long soaking time, the average circle-equivalent diameter and the number density of cementite are outside the ranges specified in the present invention. As a result, rolling fatigue characteristics and abrasion resistance are poor.

In No. 19, because of the low primary cooling rate (cooling rate to A1−60° C.), the average circle-equivalent diameter of cementite exceeds the range specified in the present invention. As a result, rolling fatigue characteristics are poor.

In No. 22, because of the high primary cooling rate, the average circle-equivalent diameter of cementite is below the range specified in the present invention. As a result, cold workability are poor.

In Nos. 25, 26, and 30 to 31, the chemical components are outside the ranges specified in the present invention.

In No. 25, because of the low C content, the number density of cementite is insufficient. As a result, abrasion resistance is poor.

In No. 26, Si, Mn, P, S, Al, Ti, and O are outside the ranges specified in the present invention, and thus the number density of cementite is insufficient. As a result, cold workability and rolling fatigue characteristics are poor.

In No. 30, because of the high Cr and O contents, the average circle-equivalent diameter of cementite is below the requirements of the present invention, and also large carbides are present in the billet. As a result, rolling fatigue characteristics are poor.

In No. 31, the Si, Mn, N, P, and S contents are outside the ranges specified in the present invention. As a result, rolling fatigue characteristics are poor.

In No. 32, Cr and N are outside the ranges specified in the present invention. As a result, cold workability and rolling fatigue characteristics are poor.

Figure 2:
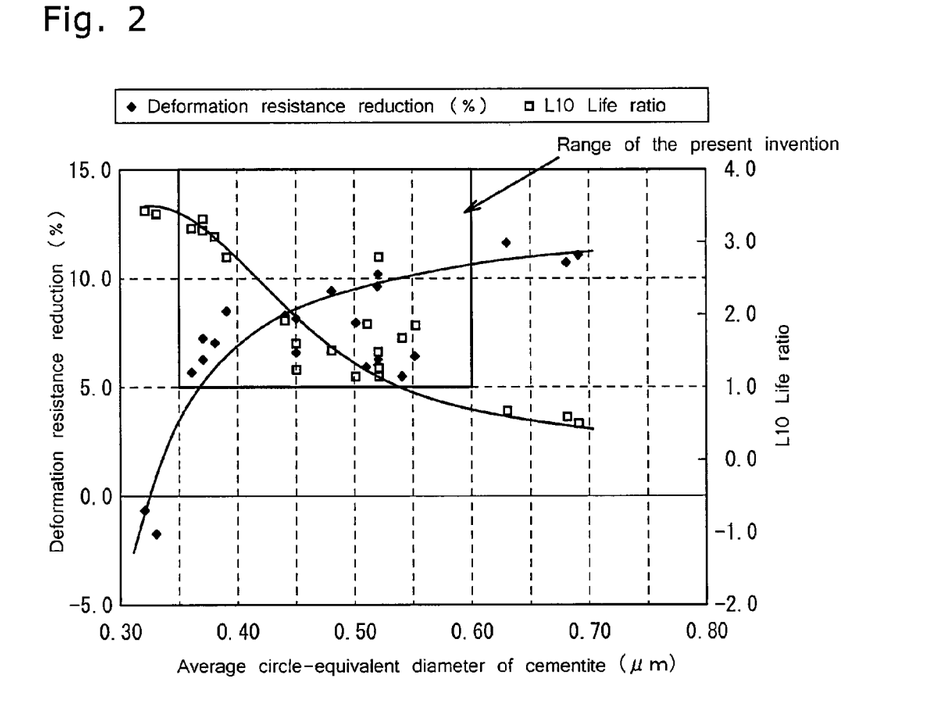
FIG. 2 shows a graph plotting the relationship of the average circle-equivalent diameter of cementite, deformation resistance reduction, and L10 life ratio.

Based on these data, FIG. 2 shows the relationship of the average circle-equivalent diameter of cementite, deformation resistance reduction (cold workability), and L10 life ratio (rolling fatigue characteristics) (plotting only examples in which the chemical component composition specified in the present invention is satisfied, and the average aspect ratio is not more than 2.00). It is shown that appropriate control on the size of cementite is effective in improving cold workability and rolling fatigue characteristics.

Figure 3:
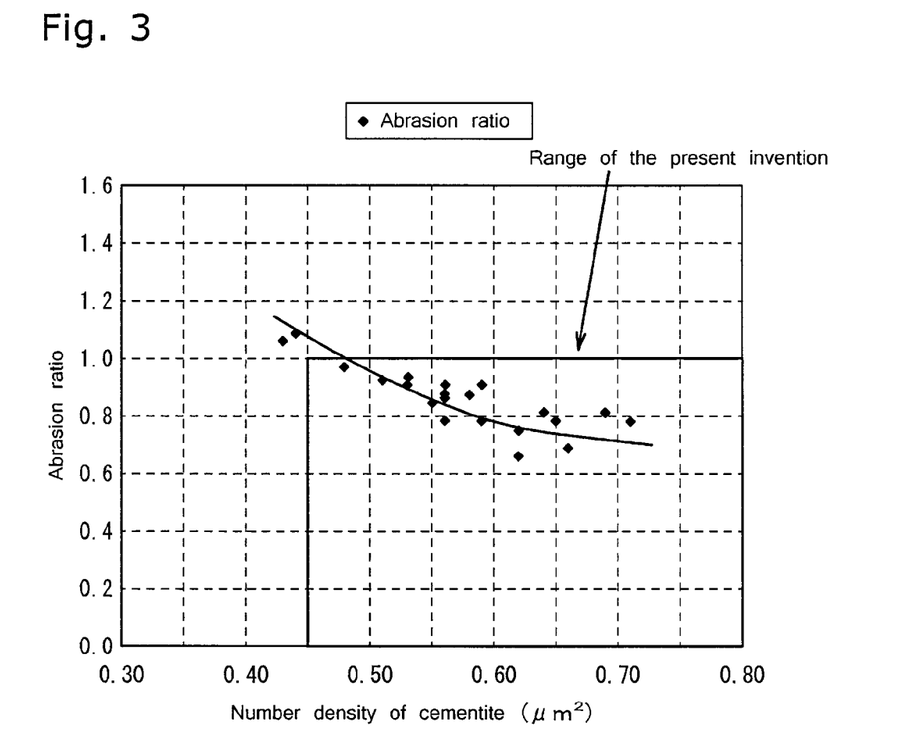
FIG. 3 shows a graph plotting the relationship between the number density of cementite and abrasion ratio.

Similarly, FIG. 3 shows the relationship between the number density of cementite and abrasion ratio (abrasion resistance) (plotting only examples in which the chemical component composition specified in the present invention is satisfied, and the aspect ratio is not more than 2.00). It is shown that appropriate control on the number density of cementite is effective in improving abrasion resistance.

The invention claimed is:

1. A steel comprising:
 iron,
 C: 0.9 to 1.10 mass %,
 Si: 0.05 to 0.49 mass %,
 Mn: 0.1 to 1.0 mass %,
 P: more than 0 but at most 0.05 mass %,
 S: more than 0 but at most 0.05 mass %,
 Cr: 0.03 to 0.40 mass %,
 Al: more than 0 but at most 0.05 mass %,
 N: 0.002 to 0.025 mass %,
 Ti: more than 0 but at most 0.0030 mass %, and
 O: more than 0 but at most 0.0025 mass %,
 wherein
 an average aspect ratio of cementite is at most 2.00,
 an average circle-equivalent diameter of cementite is 0.35 to 0.6 μm, and
 a number density of cementite having a circle-equivalent diameter of at least 0.13 μm is at least 0.45 μm$^2$.

2. The steel according to claim 1, further comprising, at least one member selected from the group consisting of Cu: more than 0 but at most 0.25 mass %, Ni: more than 0 but at most 0.25 mass %, and Mo: more than 0 but at most 0.25 mass %.

3. The steel according to claim 1, further comprising one or both of
 Nb: more than 0 but at most 0.5 mass %, and
 V: more than 0 but at most 0.5 mass %.

4. The steel according to claim 1, wherein the average aspect ratio of cementite is at most 1.90.

5. The steel according to claim 1, wherein the average aspect ratio of cementite is at most 1.70.

6. The steel according to claim 1, wherein the average circle-equivalent diameter of cementite is 0.40 to 0.55 μm.

7. The steel according to claim 1, wherein the average circle-equivalent diameter of cementite s 0.45 to 0.5 μm.

8. The steel according to claim 1, wherein the number density of cementite having a circle-equivalent diameter of at least 0.13 μm is at least 0.48/μm$^2$ and at most 1.0/μm$^2$.

9. The steel according to claim 1, wherein the number density of cementite having a circle-equivalent diameter of at least 0.13 μm is at least 0.51/μm$^2$ and at most 0.75/μm$^2$.

10. The steel according to claim 2, further comprising: one or both of
 Nb: more than 0 but at most 0.5 mass %, and
 V: more than 0 but at most 0.5 mass %.

11. The steel according to claim 1, wherein a content of C ranges from 0.95 to 1.07 mass %.

12. The steel according to claim 1, wherein a content of C ranges from 0.97 to 1.03 mass %.

13. The steel according to claim 1, wherein a content of Si ranges from 0.1 to 0.35 mass %.

14. The steel according to claim 1, wherein a content of Si ranges from 0.2 to 0.30 mass %.

15. The steel according to claim 1, wherein a content of Cr ranges from 0.1 to 0.35 mass %.

16. The steel according to claim 1, wherein a content of Cr ranges from 0.2 to 0.30 mass %.

17. The steel according to claim 1, which is obtained by a process comprising:
 heating a steel material to a soaking temperature of from (A1+10° C.) to (A1+40° C.) at a rising rate of from 40 to 100° C./hr;
 retaining the steel material at the soaking temperature for a period of from 4 to 8 hours;
 cooling the steel material to (A1−60° C.) at a cooling rate of from 5 to 15° C./hr in a primary cooling; and
 further cooling the steel material to 25° C. in a secondary cooling.

18. The steel according to claim 1, wherein a content of Mn ranges from 0.15 to 0.85 mass %.

19. The steel according to claim 1, wherein a content of Mn ranges from 0.2 to 0.8 mass %.

* * * * *